(12) United States Patent
Geveshausen et al.

(10) Patent No.: US 7,501,721 B2
(45) Date of Patent: Mar. 10, 2009

(54) REDUCED-NOISE SWITCHING POWER SUPPLY

(75) Inventors: Rick Geveshausen, Houston, TX (US); Rick Shaw, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 453 days.

(21) Appl. No.: 11/048,474

(22) Filed: Jan. 31, 2005

(65) Prior Publication Data

US 2006/0170291 A1     Aug. 3, 2006

(51) Int. Cl.
*H04B 15/00*   (2006.01)
*H05K 7/18*    (2006.01)
*H05K 9/00*    (2006.01)

(52) U.S. Cl. .............................. 307/91; 307/30; 307/89; 361/800; 174/350; 174/373

(58) Field of Classification Search ................ 307/30, 307/89, 91; 361/625, 800; 174/350, 373
See application file for complete search history.

(56) References Cited

U.S. PATENT DOCUMENTS

| | | | | |
|---|---|---|---|---|
| 5,610,368 | A * | 3/1997 | Smith | 174/355 |
| 5,726,864 | A * | 3/1998 | Copeland et al. | 361/800 |
| 6,442,046 | B1 * | 8/2002 | Sauer | 361/818 |
| 6,560,125 | B1 * | 5/2003 | Shmagin et al. | 361/818 |
| 7,129,422 | B2 * | 10/2006 | Arnold | 174/377 |
| 7,142,438 | B2 * | 11/2006 | Khalili | 363/20 |

* cited by examiner

*Primary Examiner*—Stephen W Jackson
*Assistant Examiner*—Hal I. Kaplan
(74) *Attorney, Agent, or Firm*—Thomas, Kayden, Horstemeyer & Risley, LLP

(57) ABSTRACT

A reduced-noise switching power supply includes a conductive surface disposed transversely in an air space between a line filter system component and a switching system component. The conductive surface does not encase either the line filter system component or the switching system component.

23 Claims, 2 Drawing Sheets

REDUCED-NOISE SWITCHING POWER SUPPLY

FIELD OF THE INVENTION

This invention relates generally to the reduction of noise signals in electronic systems, and more particularly to techniques for reducing noise signals generated by switching power supplies.

BACKGROUND

Many modern computers and other electronic devices make use of switching power supply circuits in order to reduce weight and to improve the efficiency of the power supply. In switching power supply circuits, current is switched on and off at a relatively high frequency-on the order of 20 to 500 kHz, for example. Often such circuits produce significant noise signals in the switching frequency range.

DETAILED DESCRIPTION OF THE PREFERRED EMBODIMENTS

Figure 1:
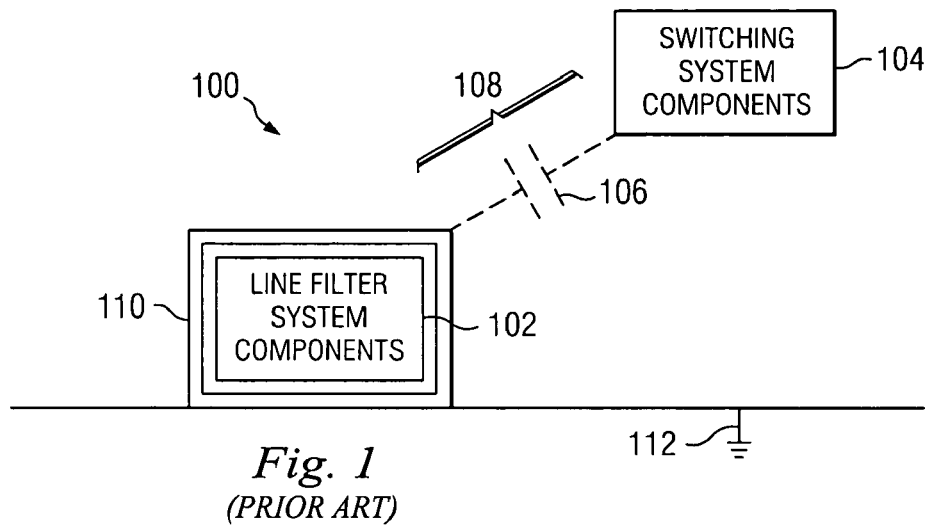
FIG. 1 is a cross-sectional plan view schematically illustrating a switching power supply according to the prior art.
Figure 2:
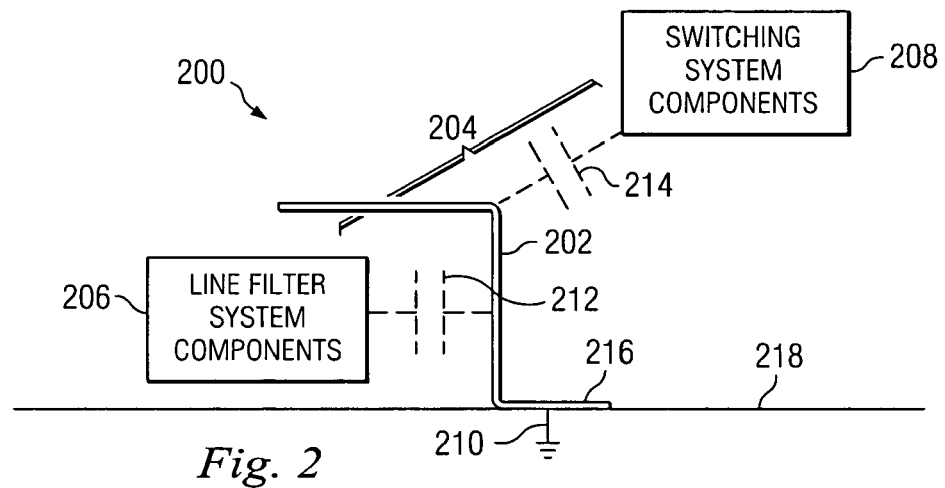
FIG. 2 is a plan view schematically illustrating a switching power supply having a conductive surface therein according to a preferred embodiment of the invention.
Figure 3:
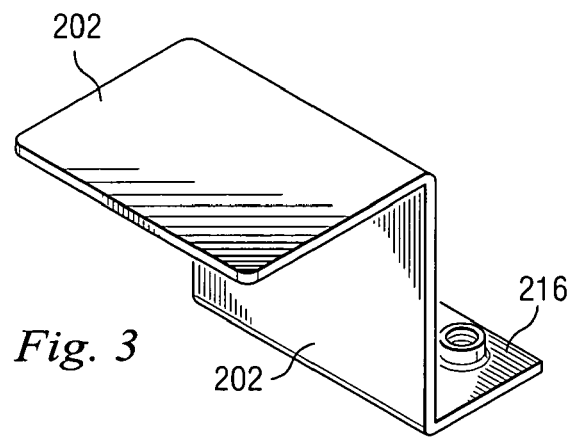
FIGS. 3-4 are oblique front and back views of the conductive surface of FIG. 2.
Figure 4:
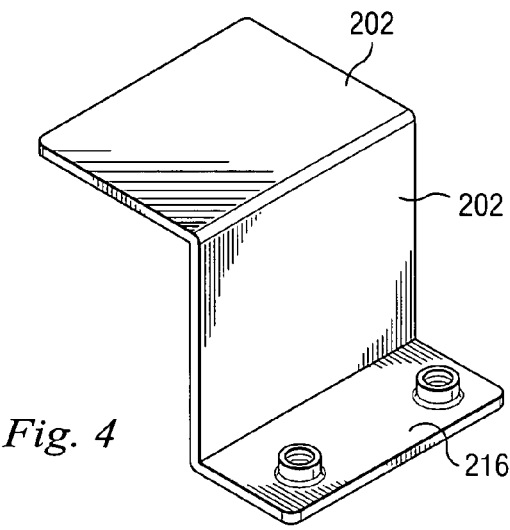

A significant portion of the noise generated by switching power supplies is due to unwanted capacitive coupling that occurs through an air space between the line filter system and the switching system. For example, FIG. 1 represents a typical switching power supply 100 according to the prior art. Power supply 100 includes a line filter system 102 that includes components such as a common mode choke, input capacitors and wiring. Power supply 100 also includes a switching system 104 that includes components such as bulk capacitors, a switch heat sink and a power factor correction inductor. The components of line filter system 102 and of switching system 104 are physically large and are spatially close to one another. Consequently, a stray capacitance 106 is present in an air space 108 that exists between line filter system 102 and switching system 104. Noise from switching system 104 is coupled to line filter system 102 via capacitance 106 and bypasses some stages of the line filter, resulting in unwanted noise signals on the line. The prior art solution to the capacitive coupling problem has been to encase the components of line filter system 102 in a conductive can 110 that covers the line filter system on all sides and that is electrically connected to a ground 112 of the power supply.

The inventors hereof have discovered that the expense and complexity of the prior art solution can be avoided by using an alternative solution to be described now in relation to FIGS. 2-5. Referring to FIGS. 2-5, a switching power supply 200 according to a preferred embodiment of the invention can be constructed by disposing a conductive surface 202 transversely in the air space 204 between a component of line filter system 206 and a component of switching system 208. Unlike the solutions of the prior art, conductive surface 202 does not encase either of line filter system 206 or switching system 208, and conductive can 110 may optionally be eliminated. The interposition of conductive surface 202 in air space 204, without more, significantly reduces the capacitive coupling between line filter system 206 and switching system 208. In a preferred embodiment, conductive surface 202 is also electrically connected to a ground 210 of power supply 200. The latter arrangement causes stray capacitances 212 and 214 to be shunted to ground 210, thereby greatly reducing the magnitude of the noise coupled to the line from switching system 208. In one embodiment, a mounting flange 216 may be provided on conductive surface 202. In such an embodiment, the electrical connection to ground may be accomplished simply by fastening mounting flange 216 to a frame 218 of power supply 200, for example with screws, rivets or other conventional fasteners or by welding.

Conductive surface 202 may take a variety of forms (such as flat, convex and concave) and shapes (such as rectangular or curved) without deviating from the scope of the invention. In one class of embodiments, surface 202 includes at least one plane as shown in the illustrated embodiment. To better accommodate component locations and the resulting shapes of air space 204, surface 202 may include at least one bend, also as shown in the illustrated embodiment. Conductive surface 202 may be fashioned from any conductive material, such as sheet metal or metal mesh for example. In other embodiments, conductive surface 202 may be fashioned with a non-conductive form having an electrically conductive material such as metallic mesh, paint, coating or tape attached thereto.

Figure 5:
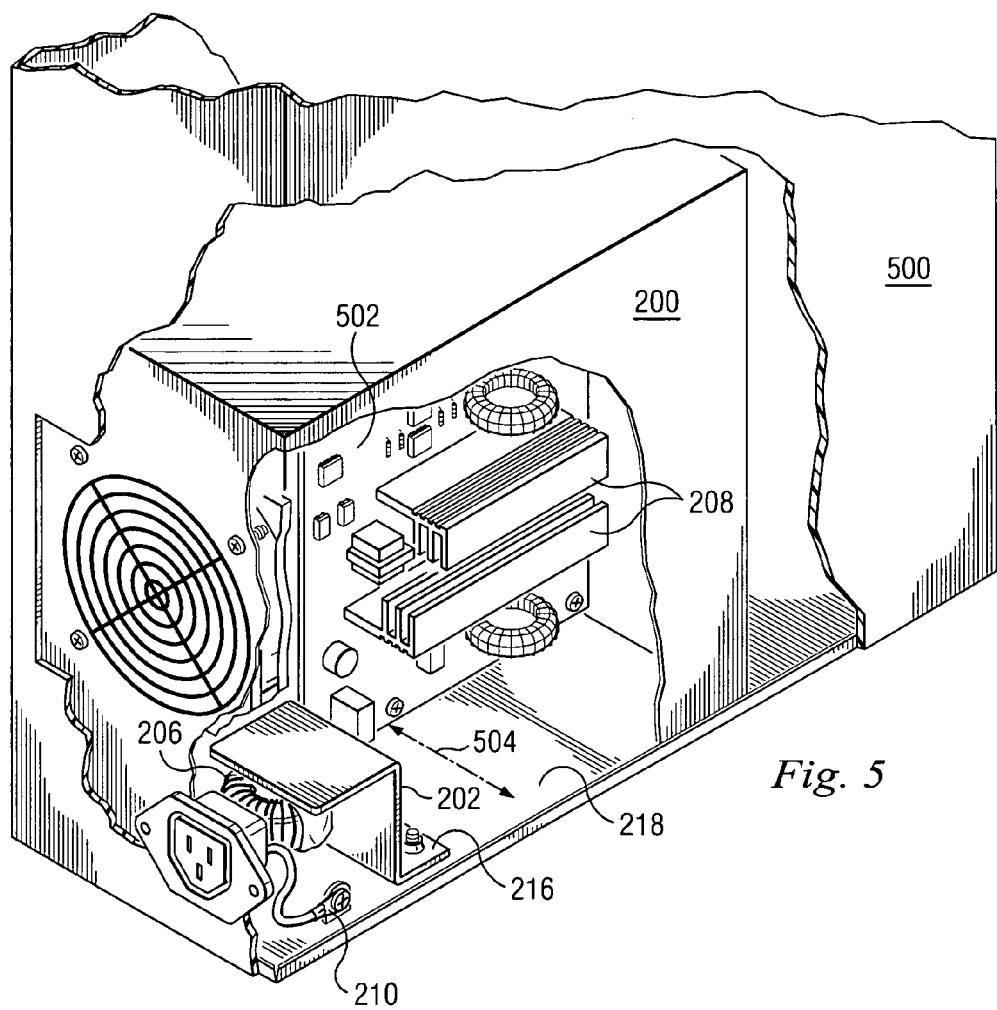
FIG. 5 is an oblique exposed view of an electronic device chassis having a switching power supply installed therein according to a preferred embodiment of the invention.

Power supply 200 may be deployed inside any electronic device, or may be used as an external power supply for such devices. FIG. 5 illustrates, by way of example, a deployment of power supply 200 inside a computer enclosure 500. In the embodiment of FIG. 5, power supply 200 includes a circuit board 502 oriented orthogonally to a substantially planar frame surface 218 of power supply 200. Switching system 208 is mounted to circuit board 502. Line filter system 206 is disposed adjacent to surface 218 on one side of circuit board 502. Conductive surface 202 is also disposed adjacent to circuit board 502 on the same side as line filter system 206. Surface 202 is oriented transversely in air space 204 as indicated by transverse direction arrow 504.

The noise reduction efficacy of surface 202 may be enhanced or degraded depending on the care taken in choosing its size and placement within power supply 200: Proximity between surface 202 and line filter 206 is desirable. And, in one preferred embodiment, a dimension of conductive surface 202 measured in transverse direction 504 is at least as wide as a dimension of either line filter system 206 or switching system 208 measured in the same direction. In a particular embodiment that was constructed for use with line filter system components and switching system components having typical sizes, conductive surface 202 measured 32 mm in transverse direction 504, 26.6 mm in the vertical direction orthogonal to the plane of frame surface 218, and 23 mm in the horizontal direction orthogonal to transverse direction 504 and parallel to the plane of frame surface 218.

While the invention has been described in detail with reference to preferred embodiments thereof, the described embodiments have been presented by way of example and not by way of limitation. It will be understood by those skilled in the art that various changes may be made in the form and details of the described embodiments without deviating from the spirit and scope of the invention as defined by the appended claims.

What is claimed is:

1. A switching power supply, comprising:
a line filter system component;
a switching system component;
an air space between the line filter system component and the switching system component; and
a conductive surface disposed transversely in the air space and physically separated from the line filter system component,
wherein the conductive surface does not encase either the line filter system component or the switching system component,
wherein the conductive surface is in direct physical contact with a ground of the switching power supply exclusively at one end of the conductive surface.

2. The switching power supply of claim 1, wherein:
the conductive surface comprises a mounting flange; and
the mounting flange is fastened to a frame of the switching power supply, thereby achieving the electrical connection to the ground of the switching power supply.

3. The switching power supply of claim 1:
wherein the conductive surface comprises a plane.

4. The switching power supply of claim 3:
wherein the plane comprises at least one bend therein.

5. The switching power supply of claim 1:
wherein the conductive surface comprises sheet metal.

6. The switching power supply of claim 1:
wherein the conductive surface comprises an electrically non-conductive form having an electrically conductive material attached thereto.

7. The switching power supply of claim 1:
wherein a transverse dimension of the conductive surface is at least as wide as a transverse dimension of either the line filter system component or the switching system component.

8. An electronic device, comprising:
an enclosure; and
a switching power supply disposed within the enclosure, wherein the switching power supply comprises:
a line filter system component;
a switching system component;
an air space between the line filter system component and the switching system component; and
a conductive surface disposed transversely in the air space and physically separated from the line filter system component,
wherein the conductive surface does not encase either the line filter system component or the switching system component,
wherein one end of the conductive surface is in direct physical contact with at least one frame surface of the enclosure and the opposite end is not in direct physical contact with any frame surface of the enclosure.

9. The electronic device of claim 8:
wherein the conductive surface is electrically connected to a ground of the switching power supply.

10. The electronic device of claim 9, wherein:
the conductive surface comprises a mounting flange; and
the mounting flange is fastened to a frame of the switching power supply, thereby achieving the electrical connection to the ground of the switching power supply.

11. The electronic device of claim 8:
wherein the conductive surface comprises a plane.

12. The electronic device of claim 11:
wherein the plane comprises at least one bend therein.

13. The electronic device of claim 8:
wherein the conductive surface comprises sheet metal.

14. The electronic device of claim 8:
wherein the conductive surface comprises an electrically non-conductive form having an electrically conductive material attached thereto.

15. The electronic device of claim 8:
wherein a transverse dimension of the conductive surface is at least as wide as a transverse dimension of either the line filter system component or the switching system component.

16. The electronic device of claim 8:
wherein the electronic device is a computer.

17. A switching power supply, comprising:
a line filter system component;
a switching system component; and
means for shunting to ground a stray capacitance between the line filter system component and the switching system component, the means for shunting physically separated from the line filter system component,
wherein the means for shunting does not encase either the line filter system component or the switching system component,
wherein the means for shunting is in direct physical contact with a ground of the switching power supply exclusively at one end of the conductive surface.

18. A switching power supply, comprising:
a substantially planar frame surface;
a circuit board oriented orthogonally to the substantially planar frame surface;
a switching system component mounted to the circuit board;
a line filter system component disposed adjacent to the substantially planar frame surface and adjacent to a first side of the circuit board; and
a conductive surface disposed adjacent to the first side of the circuit board and transversely in an air space between the switching system component and the line filter system component, the conductive surface physically separated from the line filter system component,
wherein the conductive surface does not encase either the line filter system component or the switching system component,
wherein one end of the conductive surface is in direct physical contact with the substantially planar frame surface and the opposite end is freestanding when the switching power supply is in operation.

19. The switching power supply of claim 18:
wherein the conductive surface is electrically connected to a ground.

20. The switching power supply of claim 19, wherein:
the conductive surface comprises a mounting flange; and
the mounting flange is fastened to a frame of the switching power supply, thereby achieving the electrical connection to the ground of the switching power supply.

21. The switching power supply of claim 18:
wherein the conductive surface comprises sheet metal.

22. The switching power supply of claim 18:
wherein the conductive surface comprises an electrically non-conductive form having an electrically conductive material attached thereto.

23. The switching power supply of claim 18:
wherein a transverse dimension of the conductive surface is at least as wide as a transverse dimension of either the line filter system component or the switching system component.

* * * * *